(12) United States Patent
Lopez et al.

(10) Patent No.: US 10,657,748 B2
(45) Date of Patent: *May 19, 2020

(54) TRI-ANGLED ANTENNA ARRAY FOR SECURE ACCESS CONTROL

(71) Applicant: Schlage Lock Company LLC, Carmel, IN (US)

(72) Inventors: Jenna Lopez, Indianapolis, IN (US); Nicole LaGue, Greenfield, IN (US); Pavithra S. Arunachala, Bangalore (IN); Robert MacLean, Broomfield, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,257

(22) Filed: Oct. 22, 2019

(65) Prior Publication Data

US 2020/0051354 A1    Feb. 13, 2020

Related U.S. Application Data

(63) Continuation of application No. 16/025,283, filed on Jul. 2, 2018, now Pat. No. 10,453,281.

(51) Int. Cl.
*B60R 25/00* (2013.01)
*G05B 19/00* (2006.01)
(Continued)

(52) U.S. Cl.
CPC ............ *G07C 9/30* (2020.01); *H04B 17/318* (2015.01); *H04W 4/023* (2013.01); *H01Q 1/38* (2013.01); *H04W 4/80* (2018.02)

(58) Field of Classification Search
CPC .... G07C 9/00126; H04W 4/023; H04W 4/80; H04B 17/318; H01Q 1/38
(Continued)

(56) References Cited

U.S. PATENT DOCUMENTS 6,720,861 B1    4/2004   Rodenbeck et al.
8,319,605 B2    11/2012  Hassan et al.
(Continued)

FOREIGN PATENT DOCUMENTS

WO    2014155255 A1    10/2014
WO    2016177666 A1    11/2016
WO    2017180688 A1    10/2017

OTHER PUBLICATIONS

U.S. Appl. No. 15/498,235, filed Apr. 26, 2017.

*Primary Examiner* — Tanmay K Shah
(74) *Attorney, Agent, or Firm* — Taft Stettinius & Hollister LLP

(57) ABSTRACT

An access control device according to one embodiment includes an access control mechanism, a housing, an antenna array secured within the housing and including a first, second, and third antenna adapted to radiate away from the exterior side of the door, a processor, and a memory. The memory includes a plurality of instructions that, when executed, causes the access control device to determine signal strengths of signals received by the first, second, and third antennas from the mobile device, determine whether a location of the mobile device relative to the access control device is indicative of the mobile device user's intent to access the passageway based on the signal strengths, and automatically unlock the access control mechanism in response to the location being indicative of the user's intent to access the passageway.

24 Claims, 8 Drawing Sheets

(51) Int. Cl.

| | |
|---|---|
| *G05B 23/00* | (2006.01) |
| *G06F 7/00* | (2006.01) |
| *G06F 7/04* | (2006.01) |
| *G08B 29/00* | (2006.01) |
| *G08C 19/00* | (2006.01) |
| *H04B 1/00* | (2006.01) |
| *H04B 3/00* | (2006.01) |
| *H04Q 1/00* | (2006.01) |
| *H04Q 9/00* | (2006.01) |
| *G07C 9/30* | (2020.01) |
| *H04B 17/318* | (2015.01) |
| *H04W 4/02* | (2018.01) |
| *H04W 4/80* | (2018.01) |
| *H01Q 1/38* | (2006.01) |

(58) Field of Classification Search
USPC .......................................................... 340/5.7
See application file for complete search history.

(56) References Cited

U.S. PATENT DOCUMENTS

| | | | |
|---|---|---|---|
| 9,378,598 | B2 | 6/2016 | Dumas et al. |
| 10,453,281 | B1 * | 10/2019 | Lopez .................... H01Q 21/08 |
| 2005/0046546 | A1 | 3/2005 | Masudaya |
| 2012/0234058 | A1 | 9/2012 | Neil et al. |
| 2013/0176107 | A1 | 7/2013 | Dumas et al. |
| 2013/0237193 | A1 | 9/2013 | Dumas et al. |
| 2013/0241694 | A1 | 9/2013 | Sharma et al. |
| 2014/0292481 | A1 | 10/2014 | Dumas et al. |
| 2016/0086400 | A1 | 3/2016 | Dumas et al. |
| 2016/0307385 | A1 | 10/2016 | Arfwedson et al. |

* cited by examiner

TRI-ANGLED ANTENNA ARRAY FOR SECURE ACCESS CONTROL

CROSS REFERENCE TO RELATED APPLICATIONS

The present application is a continuation of U.S. patent application Ser. No. 16/025,283 filed Jul. 2, 2018 and issued as U.S. Pat. No. 10,453,281, the contents of which are hereby incorporated herein by reference in their entirety.

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, current credential systems generally require an interaction between the credential and a reader device (e.g., on or secured to the access control device) such that the reader device may read the credential and determine whether access should be granted. In particular, a user may be required to swipe, tap, or otherwise present the credential to the reader device. In other embodiments, the user intent is verified via the user's interaction with the reader device (e.g., turning a handle/knob, capacitive touch sense, etc.). As such, access control systems generally require an active physical action on behalf of the user in order to grant the user access via the access control device.

SUMMARY

According to an embodiment, an access control device adapted to be secured to a door having an interior side and an exterior side includes an access control mechanism adapted to control access to a passageway, a housing adapted to be positioned at the exterior side of the door, an antenna array secured within the housing and including a first antenna, a second antenna, and a third antenna, wherein each of the first antenna, the second antenna, and the third antenna radiates away from the exterior side of the door, a processor, and a memory comprising a plurality of instructions stored thereon that, in response to execution by the processor, causes the access control device to determine a first signal strength of a first signal received by the first antenna from a mobile device, determine a second signal strength of a second signal received by the second antenna from the mobile device, determine a third signal strength of a third signal received by the third antenna from the mobile device, determine whether a location of the mobile device relative to the access control device is indicative of an intent of the user of the mobile device to access the passageway based on the first signal strength, the second signal strength, and the third signal strength, and automatically unlock the access control mechanism to allow access to the passageway in response to a determination that the location of the mobile device relative to the access control device is indicative of the intent of the user to access the passageway.

In some embodiments, the first antenna may be a first directional antenna, the second antenna may be a second directional antenna, and the third antenna may be a third directional antenna.

In some embodiments, the door may be adapted to extend along a first plane, the first directional antenna may be structured to extend along a second plane parallel to the first plane, the second directional antenna may be structured to extend along a third plane oblique to the second plane, and the third directional antenna may be structured to extend alone a fourth plane oblique to the second plane and the third plane.

In some embodiments, a first angle between the third plane and the second plane may be between ten and twenty degrees and a second angle between the fourth plane and the second plane may be between ten and twenty degrees.

In some embodiments, the first angle may be equal to the second angle.

In some embodiments, the access control device may further include a first printed circuit board that includes the first directional antenna, a second printed circuit board that includes the second directional antenna, and a third printed circuit board that includes the third directional antenna.

In some embodiments, the access control device may further include a flexible printed circuit board that includes one or more of the first directional antenna, the second directional antenna, or the third directional antenna.

In some embodiments, the first signal strength may be identified by a first received signal strength indication (RSSI), the second signal strength may be identified by a second RSSI, and the third signal strength may be identified by a third RSSI.

In some embodiments, the access control device may further include a radio frequency switch adapted to switch between the first antenna, the second antenna, and the third antenna to receive the first signal, the second antenna, and the third antenna in a sequential order.

In some embodiments, to determine whether the location of the mobile device relative to the access control device is indicative of the intent of the user of the mobile device to access the passageway may include to determine whether the mobile device is within a distance threshold from the access control device, determine whether the mobile device is in an exterior direction relative to the door, and determine whether the mobile device is within an angular threshold defined relative to the access control device.

In some embodiments, to automatically unlock the access control mechanism may include to automatically unlock the access control mechanism in response to a determination that the mobile device is within the distance threshold from the access control device, the mobile device is in the exterior direction relative to the door, and the mobile device is within the angular threshold defined relative to the access control device.

In some embodiments, the plurality of instructions may further cause the access control device to receive credential data from the mobile device in response to detection of the mobile device within a communication range of the access control device and determine whether the mobile device is authorized to access the passageway based on the credential data received from the mobile device, and to determine the first signal strength of the first signal may include to determine the first signal strength of the first signal received from the mobile device in response to a determination that the mobile device is authorized to access the passageway.

In some embodiments, the first signal may be a first Bluetooth communication signal received by the first antenna from the mobile device, the second signal may be a second Bluetooth communication signal received by the second antenna from the mobile device, and the third signal may be a third Bluetooth communication signal received by the third antenna from the mobile device.

According to another embodiment, an access control device adapted to be secured to a door having an interior side and an exterior side and adapted to extend along a first plane may include an access control mechanism adapted to control access to a passageway, a housing adapted to be secured to the exterior side of the door, an antenna array secured within the housing and including a first directional antenna positioned within the housing to extend along a second plane parallel to the first plane, a second directional antenna positioned within the housing to extend along a third plane oblique to the second plane, and a third directional antenna positioned within the housing to extend along a fourth plane oblique to the second plane and the third plane, wherein each of the first directional antenna, the second directional antenna, and the third directional antenna radiates away from the exterior side of the door, a processor, and a memory comprising a plurality of instructions stored thereon that, in response to execution by the processor, causes the access control device to determine a first signal strength of a first signal received by the first directional antenna from a mobile device, determine a second signal strength of a second signal received by the second directional antenna from the mobile device, determine a third signal strength of a third signal received by the third directional antenna from the mobile device, determine whether a location of the mobile device relative to the access control device is indicative of an intent of the user of the mobile device to access the passageway based on the first signal strength, the second signal strength, and the third signal strength, and automatically unlock the access control mechanism to allow access to the passageway in response to a determination that the location of the mobile device relative to the access control device is indicative of the intent of the user to access the passageway.

In some embodiments, a first angle between the third plane and the second plane may be between ten and twenty degrees, and a second angle between the fourth plane and the second plane may be between ten and twenty degrees.

In some embodiments, the first signal strength may be identified by a first received signal strength indication (RSSI), the second signal strength may be identified by a second RSSI, and the third signal strength may be identified by a third RSSI.

In some embodiments, to determine whether the location of the mobile device relative to the access control device is indicative of the intent of the user of the mobile device to access the passageway may include to determine whether the mobile device is within a distance threshold from the access control device, determine whether the mobile device is in an exterior direction relative to the door, and determine whether the mobile device is within an angular threshold defined relative to the access control device.

In some embodiments, the plurality of instructions may further cause the access control device to receive credential data from the mobile device in response to detection of the mobile device within a communication range of the access control device and determine whether the mobile device is authorized to access the passageway based on the credential data received from the mobile device, and to automatically unlock the access control mechanism may include to automatically unlock the access control mechanism in response to a determination that the mobile device is within the distance threshold from the access control device, the mobile device is in the exterior direction relative to the door, the mobile device is within the angular threshold defined relative to the access control device, and the mobile device is authorized to access the passageway.

According to yet another embodiment, an access control device adapted to be secured to a door having an interior side and an exterior side and adapted to extend along a first plane may include an access control mechanism adapted to control access to a passageway, a housing adapted to be secured to the exterior side of the door, an antenna array secured within the housing and including a first directional antenna positioned within the housing to extend along a second plane parallel to the first plane, a second directional antenna positioned within the housing to extend along a third plane that is angled between ten and twenty degrees relative to the second plane, and a third directional antenna positioned within the housing to extend along a fourth plane that is angled between ten and twenty degrees relative to each of the second plane and the third plane, wherein each of the first directional antenna, the second directional antenna, and the third directional antenna radiates away from the exterior side of the door, a processor, and a memory comprising a plurality of instructions stored thereon that, in response to execution by the processor, causes the access control device to determine a first received signal strength indication (RSSI) of a first Bluetooth communication signal received by the first directional antenna from a mobile device, determine a second RSSI of a second Bluetooth communication signal received by the second directional antenna from the mobile device, determine a third RSSI of a third Bluetooth communication signal received by the third directional antenna from the mobile device, determine whether a location of the mobile device relative to the access control device is indicative of an intent of the user of the mobile device to access the passageway based on the first RSSI, the second RSSI, and the third RSST, and automatically unlock the access control mechanism to allow access to the passageway in response to a determination that the location of the mobile device relative to the access control device is indicative of the intent of the user to access the passageway.

In some embodiments, to determine whether the location of the mobile device relative to the access control device is indicative of the intent of the user of the mobile device to access the passageway may include to determine whether the mobile device is within a distance threshold from the access control device, determine whether the mobile device is in an exterior direction relative to the door, and determine whether the mobile device is within an angular threshold defined relative to the access control device.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
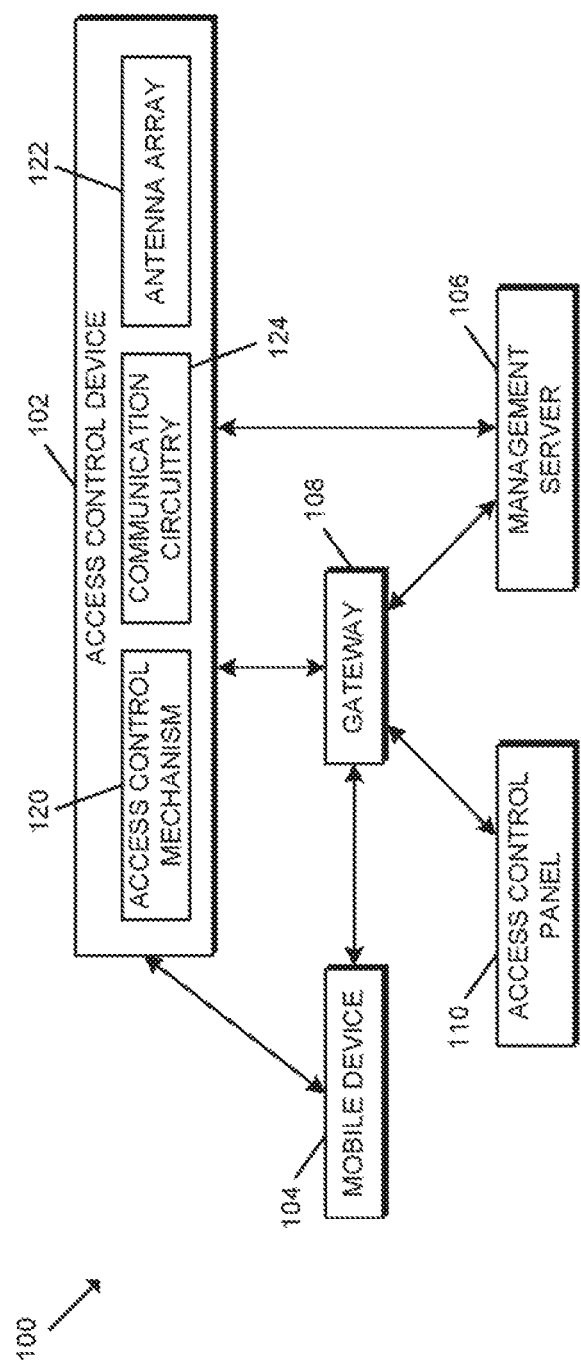
FIG. 1 is a simplified block diagram of at least one embodiment of a system for secure access control using a tri-angled antenna array.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefire not to be construed as further limiting the scope of the subject matter described herein.

Referring now to FIG. 1, in the illustrative embodiment, an access control system 100 for secure access control using an antenna array includes an access control device 102 and a mobile device 104. Additionally, in some embodiments, the access control system 100 may also include a management server 106, a gateway device 108, and/or an access control panel 110.

As described in detail below, the access control device 102 may control access to a passageway (e.g., through a doorway) via an access control mechanism 120 based on an intent of the user of the mobile device 104 (e.g., a smartphone) inferred based on wireless communication signals (e.g., Bluetooth communication signals) received from the mobile device 104. In particular, the access control device 102 may determine the signal strengths (e.g., RSSI values) of signals received by at least three different antennas in an antenna array 122 of the access control device 102. For example, communication circuitry 124 of the access control device 102 may include wireless communication circuitry (e.g., Bluetooth, Wi-Fi, and/or ZigBee communication circuitry) configured to receive wireless communication signals from the mobile device 104 via the various antennas in the antenna array 122. Further, in some embodiments, the communication circuitry 124 may include an RF switch configured to switch between the various antennas to receive the signals sequentially. In some embodiments, the access control device 102 analyzes the signal strengths of the signals received from the antennas in the antenna array 122 and determines whether a location of the mobile device 104 relative to the access control device 102 is indicative of the user's intent to access the passageway controlled by the access control device 102 based on that analysis. In particular, the access control device 102 may determine whether the mobile device 104 is within a distance threshold from the access control device 102 (e.g., a predetermined distance), whether the mobile device 104 is in an exterior direction relative to the door/passageway, and/or whether the mobile device 104 is within an angular threshold defined relative to the access control device 102 (e.g., a predetermined angle). If so, the access control device 102 may automatically unlock the access control mechanism 120 to allow the user access to the passageway. As such, it should be appreciated that the techniques described herein permit the access control system 100 to perform autonomous access control through a passageway controlled by an access control device 102 by inferring the user's intent from wireless signal strengths.

In some embodiments, the access control device 102 may communicate with the management server 106 over a Wi-Fi connection and/or with the mobile device 104 over a Bluetooth connection. Additionally, the access control device 102 may communicate with the management server 106 and/or the access control panel 110 via the gateway device 108. As such, in the illustrative embodiment, the access control device 102 may communicate with the gateway device 108 over a Wi-Fi connection and/or a Bluetooth connection, and the gateway device 108 may, in turn, forward the communicated data to the relevant management server 106 and/or access control panel 110. In particular, in some embodiments, the gateway device 108 may communicate with the access control panel 110 over a serial communication link (e.g., using RS-485 standard communication), and the gateway device 108 may communicate with the management server 106 over a Wi-Fi connection, an Ethernet connection, or another wired/wireless communication connection. As such, it should be appreciated that the access control device 102 may communicate with the management server 106 via an online mode with a persistent real-time communication connection or via an offline mode (e.g., periodically or in response to an appropriate condition) depending on the particular embodiment. As indicated above, in other embodiments, it should be appreciated that the access control device 102 may communicate with the devices of the management server 106 via another suitable communication protocol.

Further, in some embodiments, the management server 106 may communicate with multiple access control devices 102 at a single site (e.g., a particular building) and/or across multiple sites. That is, in such embodiments, the management server 106 may be configured to receive data from access control devices 102 distributed across a single building, multiple buildings on a single campus, or across multiple locations.

In some embodiments, the management server 106 may be configured to manage credentials of the access control system 100. For example, the management server 106 may be responsible for ensuring that the access control device 102 has updated authorized credentials, whitelists, blacklists, device parameters, and/or other suitable data. Similarly, in some embodiments, the management server 106 may be responsible for registering mobile devices 104 with the access control system 100 and distributing appropriate credentials to the mobile devices 104 for authorized access to the access control device 102. Additionally, in some embodiments, the management server 106 may receive security data, audit data, raw sensor data, and/or other suitable data from the access control device 102 for management of the access control system 100. In some embodiments, the management server 106 may be embodied as an online server or a cloud-based server.

It should be appreciated that each of the access control device 102, the mobile device 104, the management server 106, the gateway device 108, and/or the access control panel 110 may be embodied as a computing device similar to the computing device 200 described below in reference to FIG. 2. For example, in the illustrative embodiment, each of the access control device 102, the mobile device 104, the management server 106, the gateway device 108, and the access control panel 110 includes a processing device 202 and a memory 206 having stored thereon operating logic 208 for execution by the processing device 202 for operation of the corresponding device.

Figure 2:
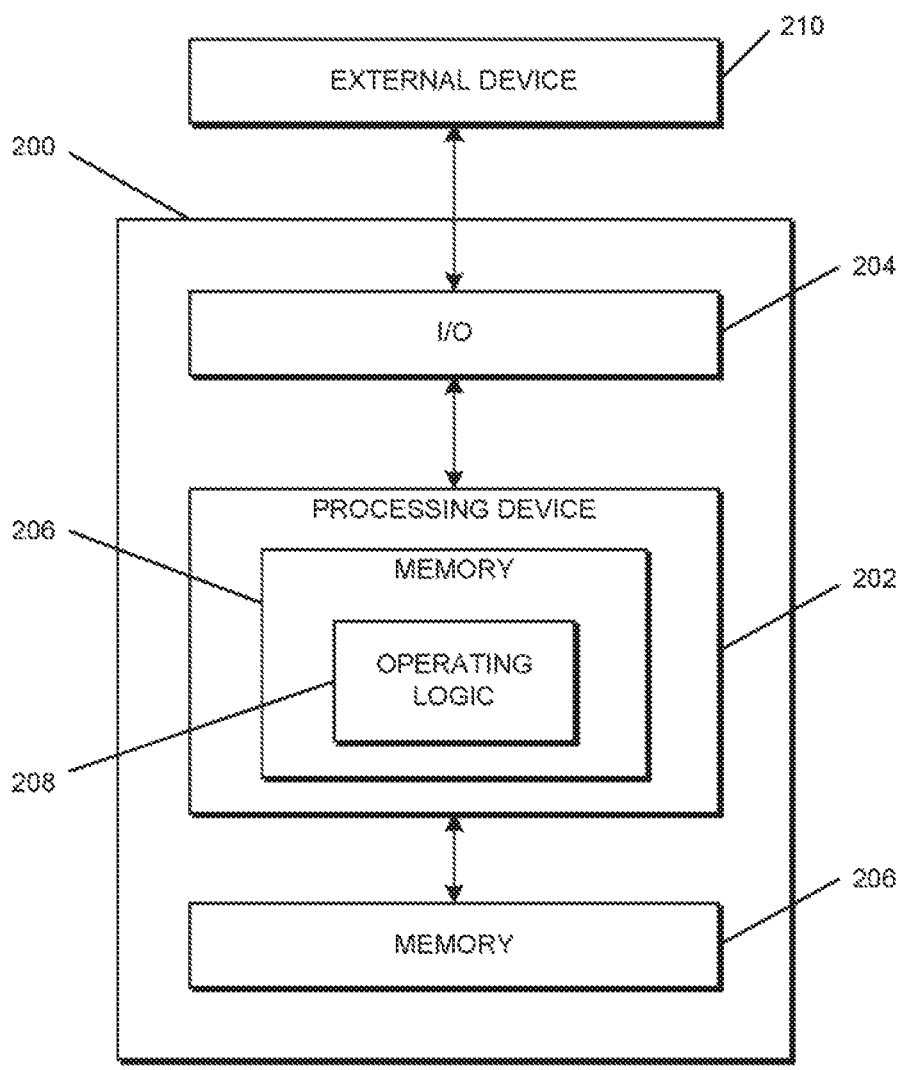
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device, mobile device, management server, gateway device, and/or access control panel that may be utilized in connection with the access control device 102, the mobile device 104, the management server 106, the gateway device 108, and/or the access control panel 110 illustrated in FIG. 1. Depending on the particular embodiment, computing device 200 may be embodied as a reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, FHDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the mobile device 104, the management server 106, the gateway device 108, and/or the access control panel 110. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

As indicated above, the illustrative access control device 102 includes an access control mechanism 120 and an antenna array 122. The access control mechanism 120 is configured to control access through a passageway. For example, in some embodiments, the access control mechanism 120 may be embodied as a lock mechanism configured to be positioned in a locked state in which access to the passageway is denied, or may be positioned in an unlocked state in which access to the passageway is permitted. In some embodiments, the lock mechanism includes a deadbolt, latch bolt, lever, and/or other mechanism adapted to move between the locked and unlocked state and otherwise perform the functions described herein. However, it should be appreciated that the access control mechanism 120 may be embodied as any another mechanism suitable for controlling access through a passageway in other embodiments.

The antenna array 122 includes a plurality of antennas positioned apart from one another and radiating toward an exterior direction relative to the door. In the illustrative embodiment, the antenna array 122 includes three antennas; however, it should be appreciated that the antenna array 122 may include a different number of antennas in other embodiments. For example, the number of antennas may be selected based on the desired accuracy of distance and/or angular location determinations of the mobile device 104 relative to the access control device 102. Additionally, in the illustrative embodiment, the antennas are embodied as directional antennas, and the antenna array 122 and communication circuitry 124 are configured to receive and process Bluetooth (e.g., Bluetooth Low Energy (BLE)) communication signals. In other embodiments, the antenna array 122 may include other suitable antennas and/or the antenna array 122 and communication circuitry 124 may be configured to receive and/or process signals over Wi-Fi (e.g., infrastructure or ad hoc mode), Wi-Fi Direct, ZigBee, Near Field Communication (NFC), and/or another suitable wireless communication protocol.

Figure 3:
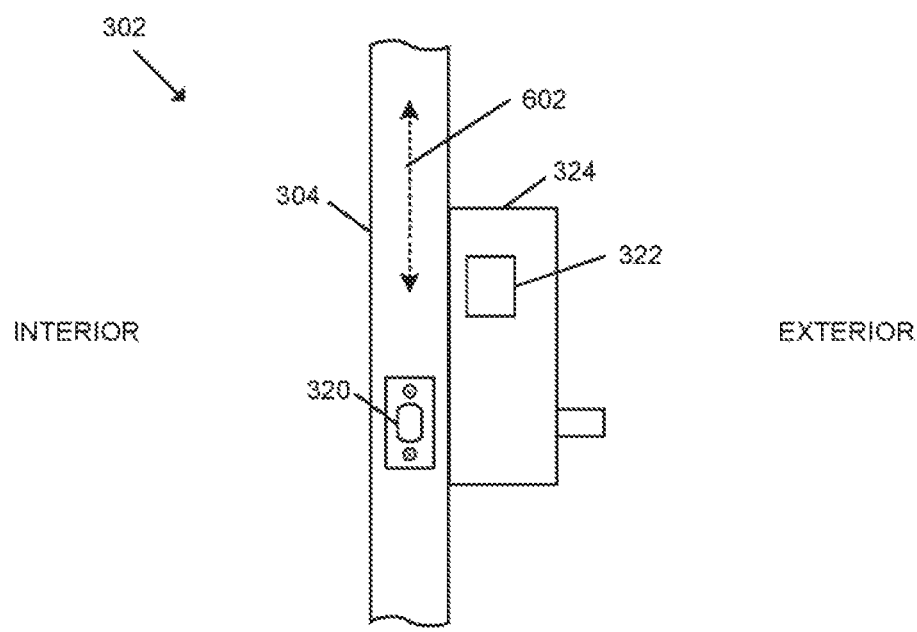
FIG. 3 is side view of at least one embodiment of an access control device of the system of FIG. 1.
Figure 4:
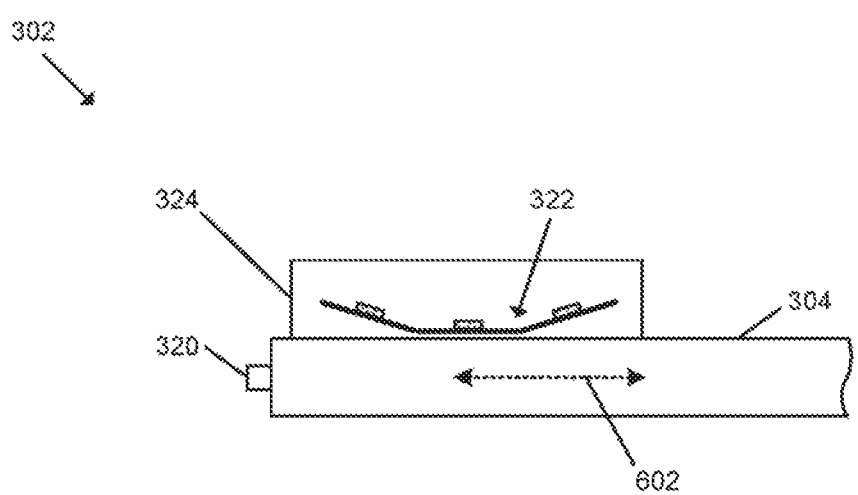
FIG. 4 is a top view of the access control device of FIG. 3.

In some embodiments, the access control device 102 may be embodied as a lock device similar to the access control device 302 of FIGS. 3-4, which is secured to a door 304 and configured to control passage through the door 304. As shown, the illustrative access control device 302 includes a lock mechanism 320 and an antenna array 322, which may be similar to the access control mechanism 120 and the antenna array 122 described above. In particular, the illustrative lock mechanism 320 includes a deadbolt, latch bolt, lever, and/or other mechanism that may be positioned in a locked state to secure the door 304 and prevent passage through the door 304 (i.e., when the door 304 is closed) or may be positioned in an unlocked state to allow passage through the door 304.

In the illustrative embodiment, the access control device 102 also includes a housing 324 adapted to be positioned at the exterior side of the door 304. In particular, in some embodiments, the housing 324 may be secured to the exterior side of the door 304. The illustrative antenna array 322 is secured within the housing 324 at fixed angles relative to the door 304, and each of the antennas of the antenna array 322 is positioned to radiate away from the exterior side of the door 304 (i.e., in the exterior direction). It should be appreciated that the antenna array 322 or, more specifically, the individual antennas of the antenna array 322 may be secured within the housing 324 using any suitable structural or mechanical mechanism for doing so. Further, depending on the particular embodiment, the housing for the antenna array 322 may or may not house or secure other components of the access control device 102. For example, in some embodiments, a single housing 324 may secure all of the electrical components of the access control device 102 positioned exterior to the door 304, whereas in other embodiments, the access control device 102 may include a separate housing that secures the antenna array 322, which may or may not be positioned within another housing (e.g., within a main housing).

Figure 5:
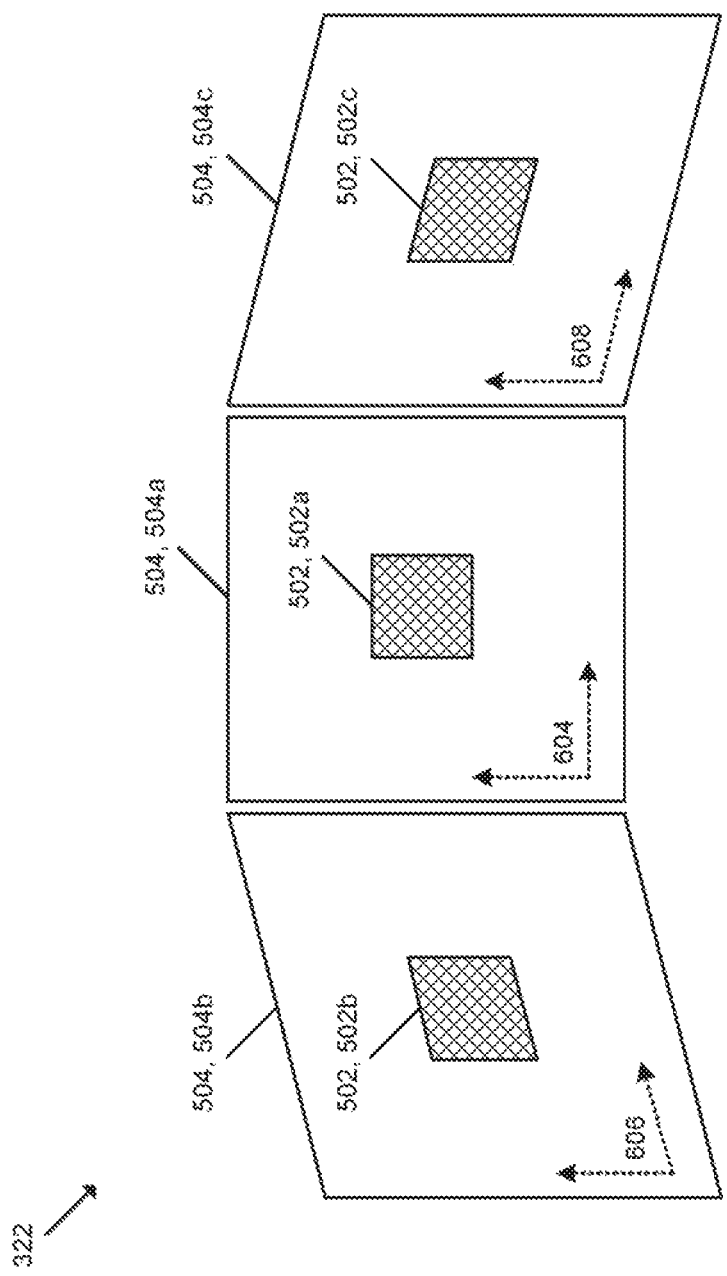
FIG. 5 is a front view of at least one embodiment of an antenna array of the access control device of FIG. 1.
Figure 6:
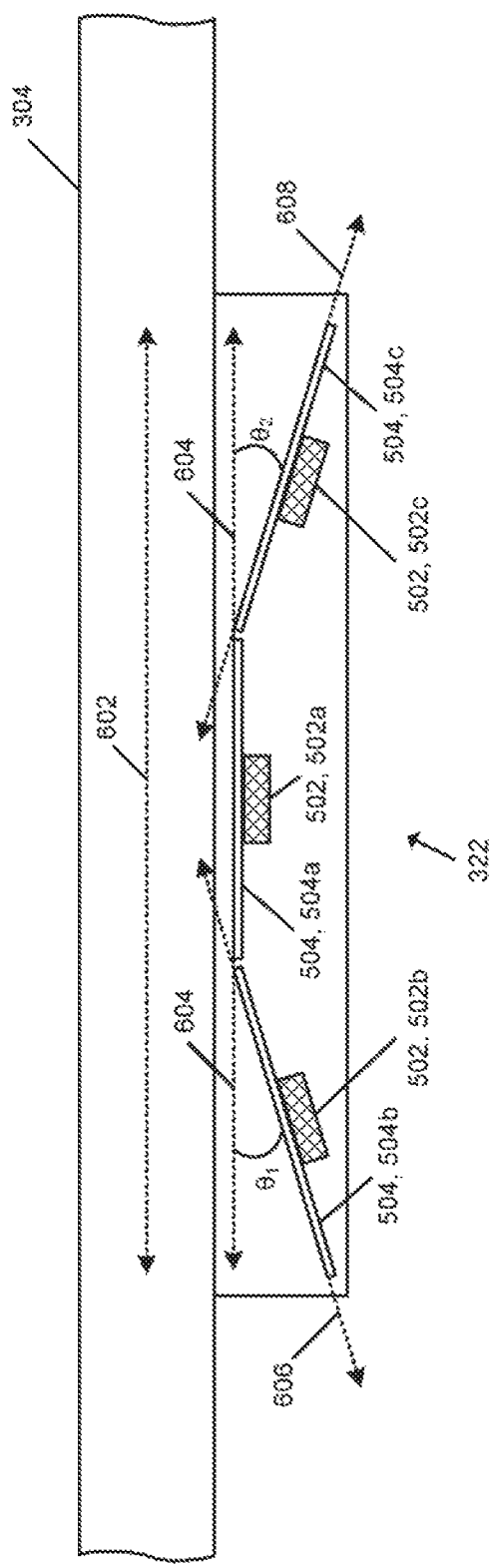
FIG. 6 is a top view of the antenna array of FIG. 5.

As described above, the antenna array 322 includes at least three different antennas 502 configured to radiate in an exterior direction relative to the door 304, and the access control device 102 may determine the signal strengths (e.g., RSSI values) of the signals received by those antennas 502, which may be analyzed to determine the location of the mobile device 104 relative to the access control device 102. In particular, as shown in FIGS. 5-6, the illustrative antenna array 322 includes three antennas 502a-c, which are embodied as directional antennas (e.g., patch antennas and/or other suitable directional antennas).

Additionally, in the illustrative embodiment, each of the antennas 502 is secured to a printed circuit board (PCB) 504 that is electrically and/or communicatively coupled to the processing device 202 of the access control device 102. More specifically, in the illustrative embodiment, the antenna 502a is secured to a PCB 504a, the antenna 502b is secured to a PCB 504b, and the antenna 502c is secured to a PCB 504c. In other embodiments, two or more of the antennas 502a-c may be secured to the same PCB 504. For example, the antennas 502a-c may be secured to a flexible or semi-flexible PCB 504 such that the antennas 502a-c may be secured to the same PCB 504 while maintaining the fixed angles described herein. In other embodiments, the PCB(s) 504 may be omitted, and the antennas 502 may be coupled to the processing device 202, the memory 206, and/or other components of the access control device 102 via other circuitry, and the antennas 502 may be otherwise secured within the housing 324 at the relevant fixed angles. In some embodiments, one or more of the PCBs 504 may be embodied as a PCB having a copper ground plane.

In the illustrative embodiment, the antennas 502a-c are positioned at fixed angles relative to one another and relative to the door 304. More specifically, as shown in FIG. 6, the door 304 is configured to extend alone a plane 602, and the antenna 502a is positioned to extend along a plane 604, which is parallel (or approximately parallel) to the plane 602 of the door 304. Further, in the illustrative embodiment, the antenna 502b is positioned to extend along a plane 606 that is oblique to the plane 604 of the antenna 502 and, therefore, oblique to the parallel plane 602 of the door 304. Similarly, the antenna 502c is positioned to extend along a plane 608 that is oblique to each of the planes 602, 604, 606. More specifically, in some embodiments, the angle $\theta_1$ between the plane 604 of the antenna 502a and the plane 606 of the antenna 502b may be an angle of between ten and twenty degrees (or approximately between ten and twenty degrees). Similarly, in some embodiments, the angle $\theta_2$ between the plane 604 of the antenna 502a and the plane 608 of the antenna 502c may be an angle of between ten and twenty degrees (or approximately between ten and twenty degrees). Further, in some embodiments, the angle $\theta_1$ between the plane 604 of the antenna 502a and the plane 606 of the antenna 502b may be equal to the angle $\theta_2$ between the plane 604 of the antenna 502a and the plane 608 of the antenna 502c. It should be appreciated that the planes 604, 606, 608 are drawn relative to the PCBs 504a-c rather than the corresponding antennas 502a-c for clarity of the figure; however, the antennas 502a-c and/or the PCBs 504a-c may extend along the planes 604, 606, 608 depending on the particular embodiment.

Figure 7:
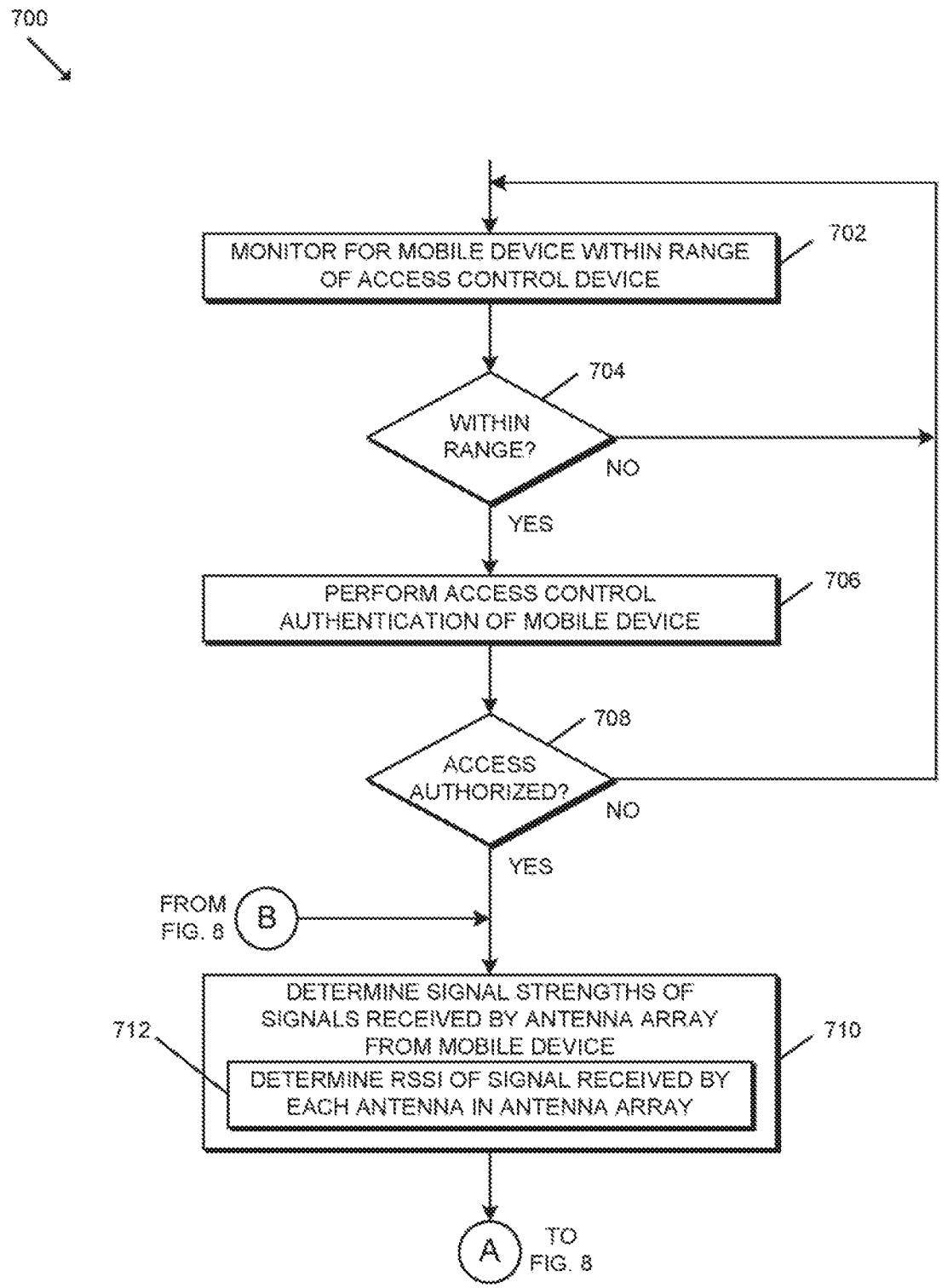
FIGS. 7-8 are a simplified block diagram of at least one embodiment of a method for secure access control using the antenna array of FIG. 1.
Figure 8:
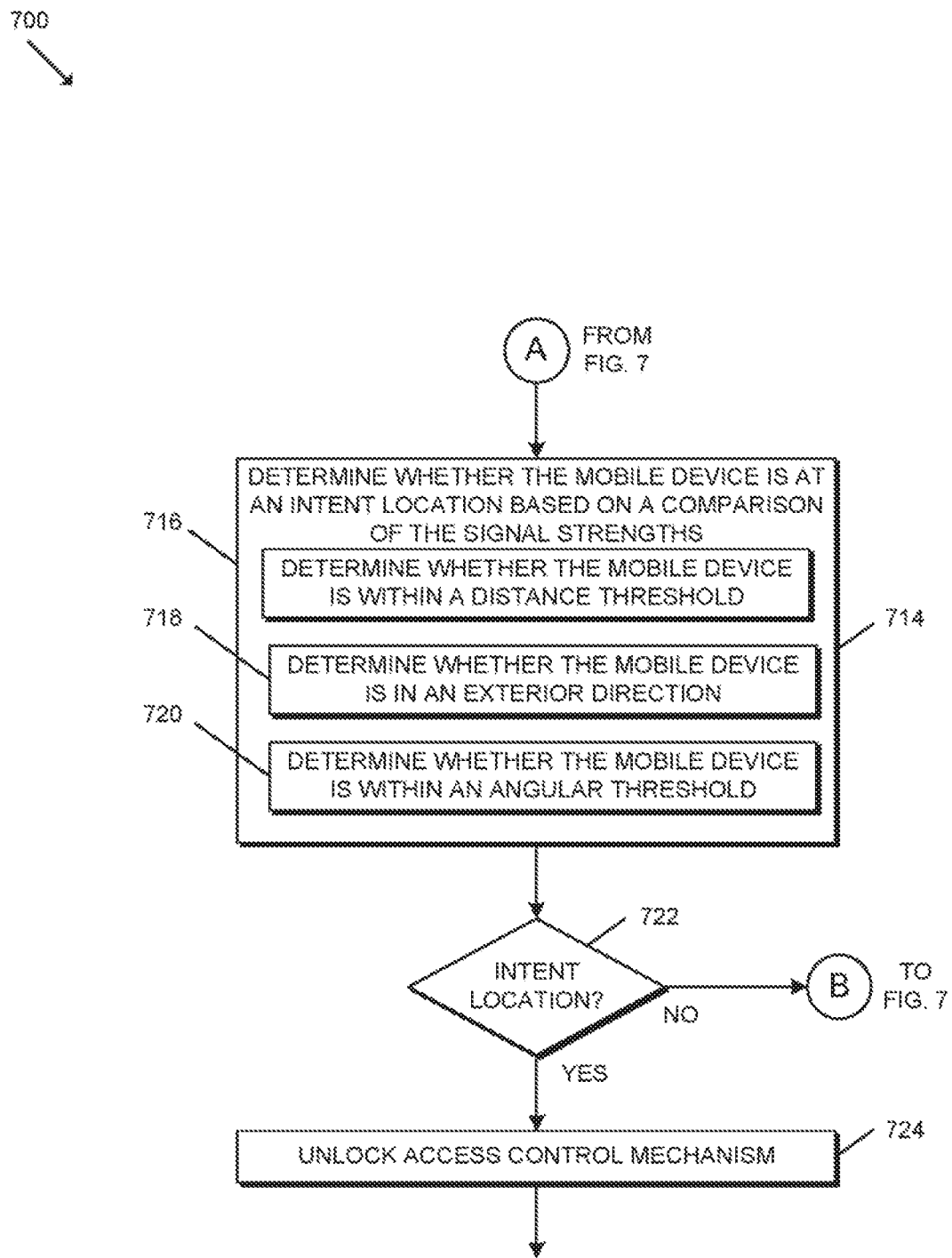

Referring now to FIGS. 7-8, in use, the access control device 102 may execute a method 700 for secure access control using the antenna array 122, 322. It should be appreciated that the particular blocks of the method 700 are illustrated by way of example, and such blocks may be combined or divided, added or removed, and/or reordered in whole or in part depending on the particular embodiment, unless stated to the contrary. The illustrative method 700 begins with block 702 of FIG. 7 in which the access control device 102 monitors for a mobile device 104 that is within wireless communication range (e.g., Bluetooth communication range) of the access control device 102. For example, in some embodiments, the access control device 102 may monitor for one or more communication protocol advertisements (e.g., Bluetooth beacon messages) to be received from a mobile device 104 within a communication range of the access control device 102. In other embodiments, the access control device 102 may advertise itself (e.g., via Bluetooth or another suitable communication protocol) and await a response from a mobile device 104 within a communication range of the access control device 102.

In block 704, the access control device 102 determines whether a mobile device 104 within communication range of the access control device 102 has been detected. If not, the method 700 returns to block 702 in which the access control device 102 continues to monitor for mobile devices 104 within communication range of the access control device 102. However, if a mobile device 104 has been detected, the method 700 advances to block 706 in which the access control device 102 performs access control authentication (i.e., authenticates) of the mobile device 104 to determine whether the mobile device 104 is authorized to access the passageway (e.g., whether the user is authorized to control the access control mechanism 120, such as by unlocking a lock mechanism) and/or another aspect of the access control device 102 or system 100. It should be appreciated that the access control device 102 may utilize any suitable algorithm, technique, and/or mechanism for authenticating the mobile device 104. For example, in some embodiments, the access control device 102 may receive credential data from the mobile device 104 and/or other unique information associated with the mobile device 104 and/or a user of the mobile device 104 and evaluate such data (e.g., based on access control data stored in an access control database). It should be appreciated that, in some embodiments, the access control device 102 may offload the authentication analysis, or a portion thereof, to one or more other devices of the access control system 100 (e.g., the management server 106). It should be further appreciated that the access control device 102 may determine that the user is authorized to access the passageway based on the authorization of the mobile device 104 to access the passageway and the user's possession of the mobile device 104.

If the access control device 102 determines, in block 708, that the user (or the mobile device 104) is not authorized to access the passageway and the mobile device 104 has therefore not been authenticated, the method 700 returns to block 702 in which the access control device 102 continues to monitor for mobile devices 104 within range or selects another mobile device 104 already identified for authentication. In other embodiments, it should be appreciated that the access control device 102 may generate an audit of the authentication failure and/or perform one or more error handling procedures. However, if the access control device 102 determines, in block 708, that the user (or the mobile device 104) is authorized to access the passageway and the mobile device 104 has therefore been authenticated, the method 700 advances to block 710 in which the access control device 102 determines the signal strengths of signals (e.g., Bluetooth communication signals) received by the antennas of the antenna array 122 from the mobile device 104. More specifically, in block 712, the access control device 102 may determine real signal strength indication (RSSI) values of the corresponding signal received by each of the antennas in the antenna array 122.

As indicated above, in some embodiments, the access control device 102 may include an RF switch that switches among the antennas of the antenna array 122 in a sequential order to receive the corresponding signal for processing. As such, more specifically, the access control device 102 may determine the signal strength (e.g., RSSI) of the signal (e.g., Bluetooth communication signal) received by the antenna 502a from the mobile device 104, the signal strength (e.g., RSSI) of the signal (e.g., Bluetooth communication signal) received by the antenna 502b from the mobile device 104, and the signal strength (e.g., RSSI) of the signal (e.g., Bluetooth communication signal) received by the antenna 502c from the mobile device 104. It should be appreciated that the particular order may vary depending on the particular embodiment and/or circumstances.

In block 714 of FIG. 8, the access control device 102 determines the location of the mobile device 104 relative to the access control device 102 based on the received signal strengths (e.g., based on the signal strengths of the signals received by the antennas 502a-c), and determines whether that location is indicative of an intent by the user of the mobile device 104 to access the passageway (e.g., a doorway secured by the access control device 102). In particular, the access control device 102 may determine whether the mobile device 104 is within a distance threshold (e.g., a predefined distance value) from the access control device 102 in block 716, determine whether the mobile device 104 is in an exterior direction relative to the door 304 in block 718, and/or determine whether the mobile device 104 is within an angular threshold defined relative to the access control device 102 (e.g., a predetermined angle relative to normal from the center of the access control device 102) in block 720. It should be appreciated that the access control device 102 may make such determinations by comparing the signal strength values to one or more thresholds (e.g., distance threshold, etc.) and/or comparing the signal strength values to one another (e.g., to determine the relative direction/angle of the mobile device 104).

If the access control device 102 determines, in block 722, that the location of the mobile device 104 is not indicative of the user's intent to access the passageway (e.g., by determining that the mobile device 104 is not within the distance threshold, that the mobile device 104 is not in an exterior direction, and/or that the mobile device 104 is not within the angular threshold), the method 700 returns to block 712 of FIG. 7 in which the access control device 102 again receives and determines the signal strengths of the signals received by the antennas of the antenna array 122 from the mobile device 104. In other words, the access control device 102 may monitor the location of the mobile device 104 over time as the mobile device 104 moves relative to the access control device 102. In some embodiments, it should be appreciated that the access control device 102 may monitor the location of, and perform the functions described herein with respect to, multiple mobile devices 104 simultaneously. In some embodiments, the method 700 may "timeout" if the location of the mobile device 104 does not become an "intent location" before the expiration of a predefined timeout period.

If the access control device 102 determines, in block 722, that the location of the mobile device 104 is indicative of the user's intent to access the passageway (e.g., by determining that the mobile device 104 is within the distance threshold, that the mobile device 104 is in an exterior direction, and that the mobile device 104 is within the angular threshold), the method 700 advances to block 724 in which the access control device 102 controls or unlocks (e.g., automatic unlock) the access control mechanism 120 to allow passage. In other words, the access control device 102 may control the access control mechanism 120 to allow passage if it is determined that the mobile device 104 is in a location determined to be indicative of intent to access the passageway and the user and/or the mobile device 104 have the appropriate credential(s) (i.e., the user is authorized to access the passageway). Although described primarily in reference to unlocking a lock mechanism, it should be appreciated that the techniques described herein may be applied to control of other access control mechanisms and/or other access control circumstances.

It should be appreciated that, in some embodiments, additional considerations may be considered that are not discussed herein thoroughly for brevity of the description. For example, in some embodiments, the access control device 102 may analyze sensor data received from various sensors of the access control device 102 to determine whether to control the access control mechanism 120. Such sensors may detect various characteristics of the physical environment of the access control device 102 (internal and/or external to the access control device 102), electrical characteristics of the access control device 102, electromagnetic characteristics of the access control device 102 or its surroundings, and/or other suitable characteristics. In particular, the access control device 102 may include a door position sensor configured to generate sensor data (e.g., by virtue of one or more signals) associated with a door position status, which may be interpreted by the processing device 202 of the access control device 102 to determine whether the door is in a closed position or an open position, and/or a latchbolt sensor configured to generate sensor data (e.g., by virtue of one or more signals) associated with a latchbolt status, which may be interpreted by the processing device 202 of the access control device 102 to determine whether the latchbolt is in an extended position or a retracted position. In various embodiments, additional and/or alternative sensors other than those described above may be included in the access control device 102. For example, in some embodiments, the access control device 102 may include proximity sensors, optical sensors, light sensors, electromagnetic sensors, hall effect sensors, audio sensors, temperature sensors, motion sensor, piezoelectric sensors, cameras, switches (e.g., reed switches, physical switches, etc.), inductive sensors, capacitive sensors, and/or other types of sensors. Of course, the access control device 102 may also include components and/or devices configured to facilitate the use of such sensors.

Although the blocks 702-722 are described in a relatively serial manner, it should be appreciated that various blocks of the method 700 may be performed in parallel in some embodiments.

Figure 9:
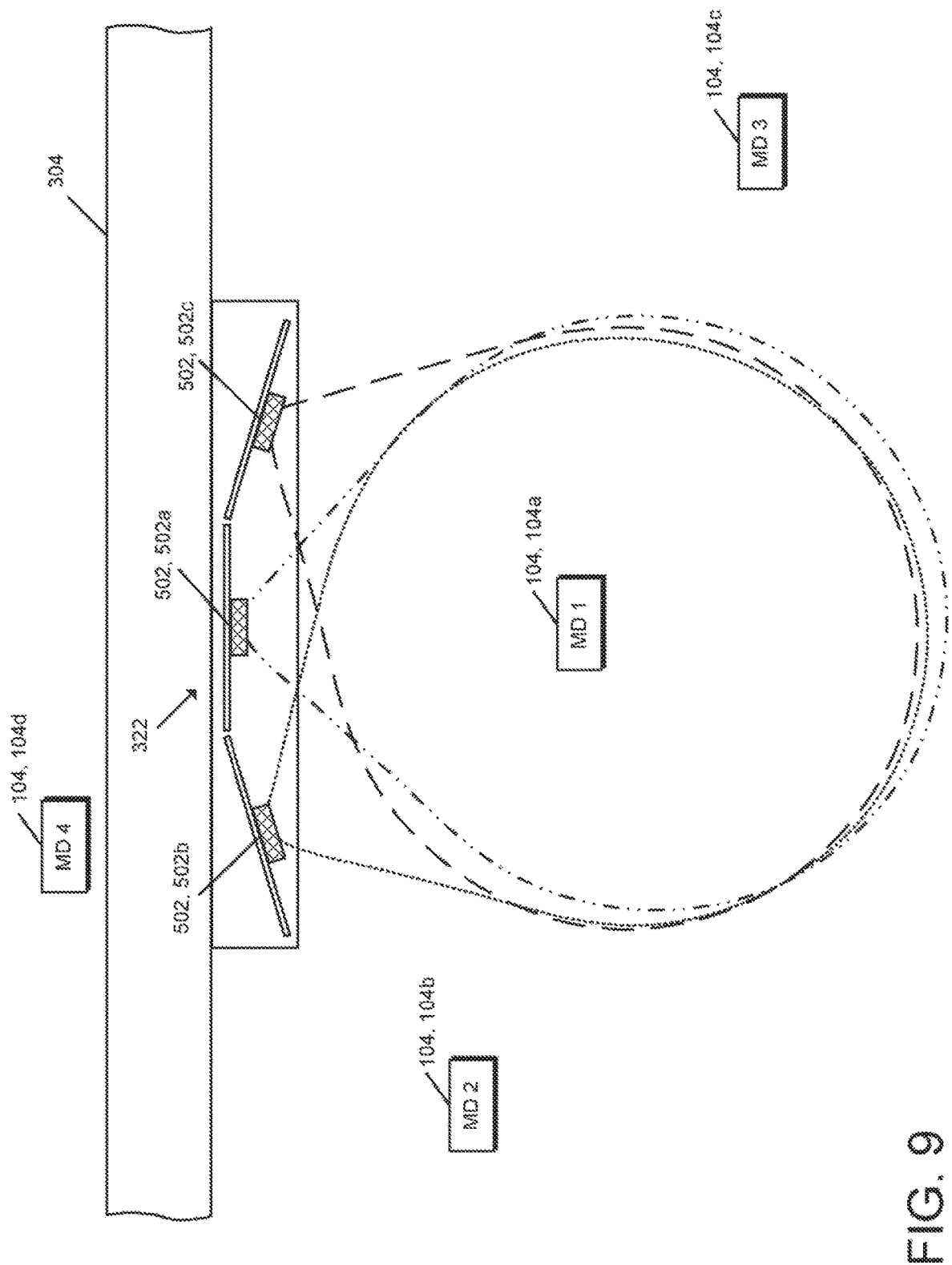
FIG. 9 illustrates various mobile devices in the vicinity of the access control device of FIG. 3.

As described above and shown in FIG. 9, each of the antennas 502*a-c* may be positioned to radiate in a corresponding exterior direction relative to the door 304. The environment of FIG. 9 depicts four mobile devices 104*a-d* within communication range of the access control device 102. By way of example, the antennas 502*a-c* may receive signals from the mobile device 104*a* having RSSI values of −28 dB, −30 dB, and −31 dB, respectively, which the access control device 102 analyzes to determine that the mobile device 104*a* is at an intent location (e.g., the mobile device 104*a* location satisfies the distance threshold and the angular threshold, and the mobile device 104*a* is to the exterior direction relative to the door 304). However, the antennas 502*a-c* may receive signals from the mobile device 104*b* having RSSI values of −70 dB, −75 dB, and −60 dB, respectively, which the access control device 102 analyzes to determine that the mobile device 104*b* is not at an intent location (e.g., the mobile device 104*b* location satisfies neither the distance threshold nor the angular threshold). Similarly, the antennas 502*a-c* may receive signals from the mobile device 104*c* having RSSI values of −68 dB, −62 dB, and −70 dB, respectively, which the access control device 102 analyzes to determine that the mobile device 104*c* is not at an intent location (e.g., the mobile device 104*c* location satisfies neither the distance threshold nor the angular threshold). The antennas 502*a-c* may also receive signals from the mobile device 104*d* having RSSI values of −30B, −34 dB, and −34 dB, respectively, which the access control device 102 analyzes to determine that the mobile device 104*d* is not at an intent location (e.g., the mobile device 104*b* is not to the exterior direction relative to the door 304). Depending on the particular embodiment, it should be appreciated that the various thresholds and directions may be hardware-, firmware-, and/or software-defined. Further, in some embodiments, one or more of the thresholds may be modified by the access control device 102, the management server 106, and/or another suitable device of the access control system 100.

What is claimed is:

1. An access control device adapted to be secured to a door having an interior side and an exterior side, the access control device comprising:
    an access control mechanism adapted to control access to a passageway;
    a housing adapted to be positioned at the exterior side of the door;
    an antenna array secured within the housing and including a plurality of antennas that are angularly offset relative to one another;
    a processor; and
    a memory comprising a plurality of instructions stored thereon that, in response to execution by the processor, causes the access control device to:
        determine a first signal strength of a first signal received by one of the plurality of antennas from a mobile device;
        determine a second signal strength of a second signal received by another of the plurality of antennas from the mobile device;
        determine whether a location of the mobile device relative to the access control device is indicative of an intent of the user of the mobile device to access the passageway based on the first signal strength and the second signal strength; and
        automatically unlock the access control mechanism to allow access to the passageway in response to a determination that the location of the mobile device relative to the access control device is indicative of the intent of the user to access the passageway.

2. The access control device of claim 1, wherein each of the plurality of antennas are directional antennas.

3. The access control device of claim 1, wherein in response to execution by the processor, the plurality of instructions stored on the memory causes the access control device to:
    determine a third signal strength of a third signal received by a further one of the plurality of antennas from the mobile device; and
    determine whether a location of the mobile device relative to the access control device is indicative of an intent of the user of the mobile device to access the passageway based on the first signal strength, the second signal strength, and the third signal strength.

4. The access control device of claim 1, wherein the plurality of antennas include a first antenna, a second antenna, and a third antenna.

5. The access control device of claim 4, wherein at least two of the first antenna, the second antenna, and the third antenna radiates away from the exterior side of the door.

6. The access control device of claim 4, further comprising:
    a first printed circuit board that includes the first antenna;
    a second printed circuit board that includes the second antenna; and
    a third printed circuit board that includes the third antenna.

7. The access control device of claim 4, wherein the door is adapted to extend along a first plane;
    wherein the first antenna is structured to extend along a second plane parallel to the first plane;
    wherein the second antenna is structured to extend along a third plane oblique to the second plane; and
    wherein the third antenna is structured to extend alone a fourth plane oblique to the second plane and the third plane.

8. The access control device of claim 7, wherein a first angle between the third plane and the second plane is between ten and twenty degrees; and
    wherein a second angle between the fourth plane and the second plane is between ten and twenty degrees.

9. The access control device of claim 8, wherein the first angle is equal to the second angle.

10. The access control device of claim 1, wherein the first signal strength is identified by a first received signal strength indication (RSSI); and
    wherein the second signal strength is identified by a second RSSI.

11. The access control device of claim 1, further comprising a radio frequency switch adapted to switch between the plurality of antennas in a sequential order.

12. The access control device of claim 1, wherein to determine whether the location of the mobile device relative to the access control device is indicative of the intent of the user of the mobile device to access the passageway comprises to:
- determine whether the mobile device is within a distance threshold from the access control device;
- determine whether the mobile device is in an exterior direction relative to the door; and
- determine whether the mobile device is within an angular threshold defined relative to the access control device.

13. The access control device of claim 12, wherein to automatically unlock the access control mechanism comprises to automatically unlock the access control mechanism in response to a determination that (i) the mobile device is within the distance threshold from the access control device, (ii) the mobile device is in the exterior direction relative to the door, and (iii) the mobile device is within the angular threshold defined relative to the access control device.

14. The access control device of claim 1, wherein the plurality of instructions further causes the access control device to:
- receive credential data from the mobile device in response to detection of the mobile device within a communication range of the access control device; and
- determine whether the mobile device is authorized to access the passageway based on the credential data received from the mobile device; and
- wherein to determine the first signal strength of the first signal comprises to determine the first signal strength of the first signal received from the mobile device in response to a determination that the mobile device is authorized to access the passageway.

15. The access control device of claim 1, wherein the first and second signals are Bluetooth communication signals.

16. An access control device adapted to be secured to a door having an interior side and an exterior side, the door adapted to extend along a first plane, the access control device comprising:
- an access control mechanism adapted to control access to a passageway;
- a housing adapted to be secured to the exterior side of the door;
- an antenna array secured within the housing and including a plurality of directional antennas that are positioned at oblique angles relative to one another;
- a processor; and
- a memory comprising a plurality of instructions stored thereon that, in response to execution by the processor, causes the access control device to:
  - determine a first signal strength of a first signal received by one of the directional antennas from a mobile device;
  - determine a second signal strength of a second signal received by another of the directional antennas from the mobile device;
  - determine whether a location of the mobile device relative to the access control device is indicative of an intent of the user of the mobile device to access the passageway based on the first signal strength and the second signal strength; and
  - automatically unlock the access control mechanism to allow access to the passageway in response to a determination that the location of the mobile device relative to the access control device is indicative of the intent of the user to access the passageway.

17. The access control device of claim 16, wherein at least two of the directional antennas radiates away from the exterior side of the door.

18. The access control device of claim 16, wherein the antenna array includes a first directional antenna positioned within the housing to extend along a second plane parallel to the first plane, a second directional antenna positioned within the housing to extend along a third plane oblique to the second plane, and a third directional antenna positioned within the housing to extend along a fourth plane oblique to the second plane and the third plane.

19. The access control device of claim 18, wherein a first angle between the third plane and the second plane is between ten and twenty degrees; and
- wherein a second angle between the fourth plane and the second plane is between ten and twenty degrees.

20. The access control device of claim 16, wherein to determine whether the location of the mobile device relative to the access control device is indicative of the intent of the user of the mobile device to access the passageway comprises to:
- determine whether the mobile device is within a distance threshold from the access control device;
- determine whether the mobile device is in an exterior direction relative to the door; and
- determine whether the mobile device is within an angular threshold defined relative to the access control device.

21. The access control device of claim 16, wherein the plurality of instructions further causes the access control device to:
- receive credential data from the mobile device in response to detection of the mobile device within a communication range of the access control device; and
- determine whether the mobile device is authorized to access the passageway based on the credential data received from the mobile device; and
- wherein to automatically unlock the access control mechanism comprises to automatically unlock the access control mechanism in response to a determination that (i) the mobile device is within the distance threshold from the access control device, (ii) the mobile device is in the exterior direction relative to the door, (iii) the mobile device is within the angular threshold defined relative to the access control device, and (iv) the mobile device is authorized to access the passageway.

22. An access control device adapted to be secured to a door having an interior side and an exterior side, the door adapted to extend along a first plane, the access control device comprising:
- an access control mechanism adapted to control access to a passageway;
- a housing adapted to be secured to the exterior side of the door;
- an antenna array secured within the housing and including a plurality of directional antennas that are positioned at oblique angles relative to one another;
- a processor; and
- a memory comprising a plurality of instructions stored thereon that, in response to execution by the processor, causes the access control device to:
  - determine a first received signal strength indication (RSSI) of a first Bluetooth communication signal received by one of the directional antennas from a mobile device;

determine a second RSSI of a second Bluetooth communication signal received by another of the directional antennas from the mobile device;

determine whether a location of the mobile device relative to the access control device is indicative of an intent of the user of the mobile device to access the passageway based on the first RSSI and the second RSSI; and automatically unlock the access control mechanism to allow access to the passageway in response to a determination that the location of the mobile device relative to the access control device is indicative of the intent of the user to access the passageway.

23. The access control device of claim 22, wherein to determine whether the location of the mobile device relative to the access control device is indicative of the intent of the user of the mobile device to access the passageway comprises to:

determine whether the mobile device is within a distance threshold from the access control device;

determine whether the mobile device is in an exterior direction relative to the door; and determine whether the mobile device is within an angular threshold defined relative to the access control device.

24. The access control device of claim 22, wherein the plurality of instructions further causes the access control device to:

receive credential data from the mobile device in response to detection of the mobile device within a communication range of the access control device; and determine whether the mobile device is authorized to access the passageway based on the credential data received from the mobile device; and wherein to automatically unlock the access control mechanism comprises to automatically unlock the access control mechanism in response to a determination that (i) the mobile device is within the distance threshold from the access control device, (ii) the mobile device is in the exterior direction relative to the door, (iii) the mobile device is within the angular threshold defined relative to the access control device, and (iv) the mobile device is authorized to access the passageway.

* * * * *